United States Patent [19]

Nanba

[11] Patent Number: 5,764,407
[45] Date of Patent: Jun. 9, 1998

[54] DISPLAYING APPARATUS USING SPATIAL LIGHT MODULATION ELEMENT

[75] Inventor: Norihiro Nanba, Kawasaki, Japan

[73] Assignee: Canon Kabushiki Kaisha, Tokyo, Japan

[21] Appl. No.: 434,783

[22] Filed: May 4, 1995

[30] Foreign Application Priority Data

May 13, 1994 [JP] Japan .................. 6-124529

[51] Int. Cl.[6] .............. G02B 5/20; G02B 21/36; G02B 26/00; G02B 21/06
[52] U.S. Cl. ............ 359/362; 359/363; 359/608; 359/636; 359/663; 359/290; 359/291; 359/386; 359/387; 359/423; 359/434; 359/429; 359/599
[58] Field of Search ................ 359/362, 363, 359/13, 15, 40, 41, 608, 599, 423, 424, 450, 614, 630, 636, 663, 290, 291, 292, 386, 387, 434, 429

[56] References Cited

U.S. PATENT DOCUMENTS

| | | | |
|---|---|---|---|
| 4,265,518 | 5/1981 | Matsumura | 351/7 |
| 4,449,048 | 5/1984 | Pinches et al. | 250/308 |
| 4,538,062 | 8/1985 | Shishido | 250/201 |
| 4,634,240 | 1/1987 | Suzuki et al. | 359/369 |
| 4,729,018 | 3/1988 | Watanabe et al. | 358/98 |
| 4,902,115 | 2/1990 | Takahashi | 359/40 |
| 5,395,356 | 3/1995 | King et al. | 606/4 |
| 5,442,467 | 8/1995 | Silverstein et al. | 359/42 |

FOREIGN PATENT DOCUMENTS

| | | | |
|---|---|---|---|
| 406130356 | 5/1994 | Japan | 359/599 |
| 406186472 | 7/1994 | Japan | 359/434 |

Primary Examiner—Paul M. Dzierzynski
Assistant Examiner—Mohammad Y. Sikder
Attorney, Agent, or Firm—Morgan & Finnegan,LLP

[57] ABSTRACT

An display apparatus has an image displaying device for modulating light by a spatial light modulation element and displaying an image, a relay optical system for forming the image on an imaging plane at a location differing from the image displaying device, an eyepiece optical system for directing the light from the imaging plane to an observer's pupil, and light beam controlling device provided in a portion of the relay optical system for controlling the amount of transmission of a light beam from the image displaying device correspondingly to the inclination of the contrast distribution of the light beam.

5 Claims, 6 Drawing Sheets

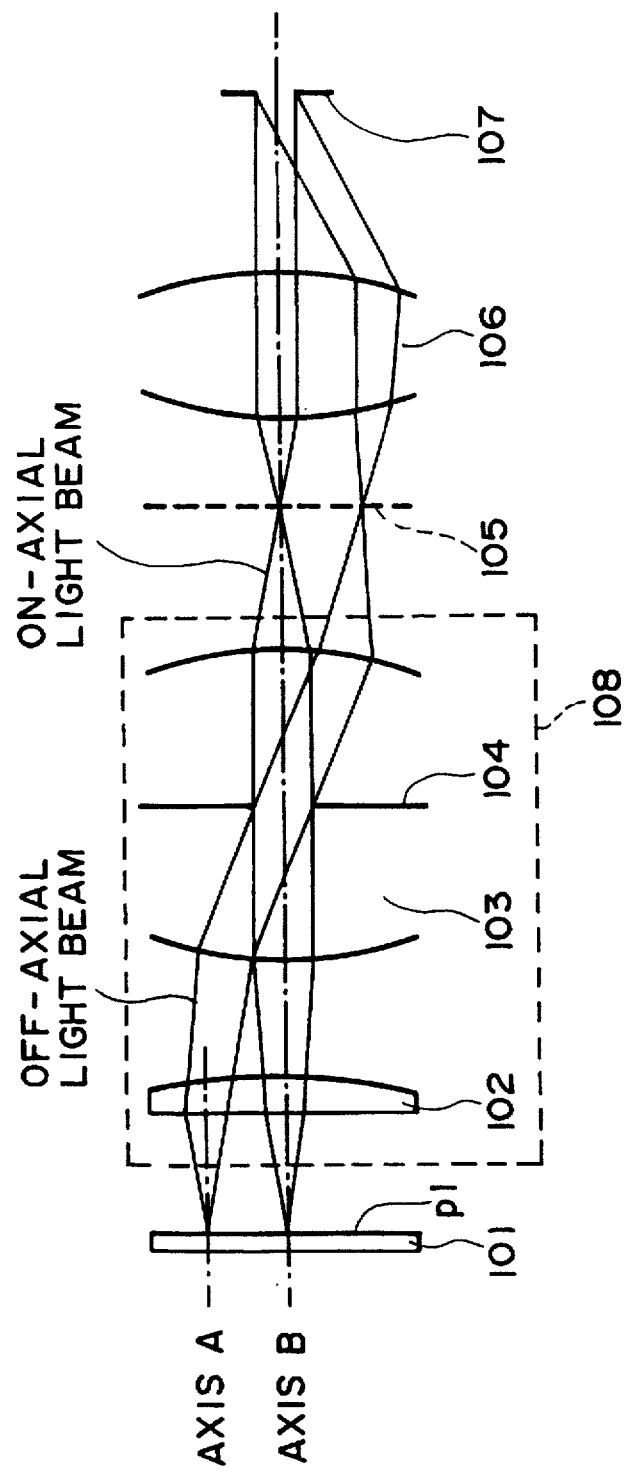

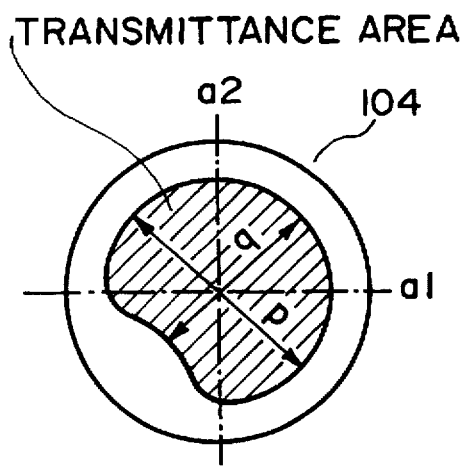
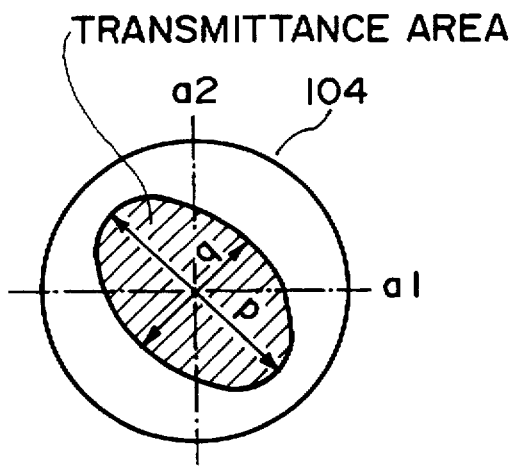
FIG. 4A            FIG. 4B
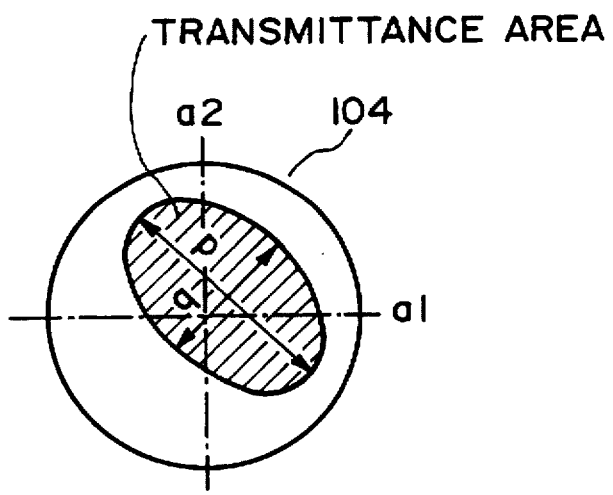
FIG. 4C

DISPLAYING APPARATUS USING SPATIAL LIGHT MODULATION ELEMENT

BACKGROUND OF THE INVENTION

1. Field of the Invention

This invention relates to a display, and particularly to a display using a spatial light modulation element such as a liquid crystal display element as image displaying means and suitable for an observer to observe image information displayed by the image displaying means as an enlarged virtual image.

2. Related Background Art

For example, various so-called helmet mounted displays (HMDs) which are made integral with helmets have heretofore been proposed as displays disposed near an observer's eye and adapted to observe thereon image information displayed by image displaying means. These HMDs are used chiefly as displays of high performance for aircraft pilots and for flight simulation.

For example, Japanese Laid-Open Patent Application No. 3-39924 proposes an HMD adapted to display image information as a virtual image in front of a pilot to make the pilot recognize image information such as flight data. This HMD is designed such that image information such as text data displayed on a CRT is spatially superposed on an exterior to enable the pilot to observe the image information and the exterior at a time. In that proposition, the image information on the CRT is intermediately image by a relay optical system, and this image is formed as a virtual image forwardly of the observer by a spherical mirror. In this proposal, a CRT is used for the display of the image information, and this has led to the tendency of the construction of the entire apparatus toward bulkiness.

In contrast, Japanese Laid-Open Patent Application No. 5-117876 discloses a compact and lightweight display using a liquid crystal panel of the transmission type for the display of image information. This is designed such that an image displayed on the liquid crystal panel is formed afar into an enlarged virtual image through an eyepiece and an observer observes this enlarged virtual image.

Also, Japanese Patent Application No. 5-302308 proposes an image displaying device of the head mounted type using a spatial light modulation element such as a liquid crystal display element. According to this patent application, image information displayed by the spatial light modulation element is intermediately imaged as an aerial image by a relay optical system and this aerial image is observed as a virtual image enlarged by an eyepiece optical system.

The liquid crystal display element used in such a displaying device is generally of the twisted nematic mode (hereinafter abbreviated as TN mode). The TN mode assumes a construction in which two glass substrates subjected to a rubbing process are disposed so that their directions of polarization may be orthogonal to each other and liquid crystal is enclosed between the two transparent substrates. By such construction, near the transparent substrates, the orientation of the liquid crystal therein is uniformized in the directions of polarization of the substrates, and between the two transparent substrates, the liquid crystal molecules therein are twisted by 90°. Thus, the polarization axis of light transmitted through this liquid crystal layer is rotated by 90°. When an electric field is applied to this liquid crystal layer, the liquid crystal molecules become arranged parallel to the electric field due to their own dielectric anisotropy and lose their optical activity. So, when two front and rear polarizing plates have their polarization axes set in the same direction as the direction of arrangement of the liquid crystal molecules in an electroless field, there will appear so-called normally white display in which light is transmitted during voltage off and is not transmitted during voltage on. Also, when the polarization axes of the polarizing plates are disposed parallel to each other, there will conversely appear normally black display.

The liquid crystal display element of the TN mode of such a construction has angle-of-visibility dependency as its inherent characteristic. This is the nature of contrast being reduced depending on the angle at which the liquid crystal display surface is seen or the displayed image becoming invisible. FIG. 1 of the accompanying drawings shows an example of the contrast distribution on a liquid crystal display surface p1.

In FIG. 1, an angle θ indicated in the circumferential direction represents the direction of emergence of rays of light on the display surface, and an angle Φ indicated in the radial direction represents an angle formed between a segment in which a ray of light is perpendicularly projected onto the liquid crystal display surface p1 and the ray of light. The angles θ and Φ indicated in FIG. 1 will now be described with reference to FIG. 2 of the accompanying drawings, which shows a ray of light emerging from the liquid crystal display surface p1. In FIG. 2, the reference numeral 901 designates a certain point on the liquid crystal display surface p1, the reference numeral 902 denotes a circle on the liquid crystal display surface p1 centering around the point 901, the reference numeral 903 designates a ray of light emerging from the point 901, and the reference numeral 904 denotes a segment in which the ray of light 903 is perpendicularly projected onto the liquid crystal display surface p1.

a1 and a2 designate axes along the directions of polarization of the aforedescribed transparent substrates, and these axes a1 and a2 are orthogonal to each other on the liquid crystal display surface p1. a3 denotes an axis orthogonal to the axes a1 and a2, i.e., an axis in the direction of the normal to the liquid crystal display surface p1, and b1 and b2 designate axes forming an angle of 45° on the liquid crystal display surface p1 with respect to the axes a1 and a2. The direction of emergence of the ray of light 903 is represented as the polar coordinates system by the angle θ and Φ. The angle θ is an angle the segment 904 in which the ray of light 903 is perpendicularly projected onto the liquid crystal display surface p1 forms with respect to the axis a1. The angle θ is an angle the ray of light 903 forms with respect to the projection segment 904. It is FIG. 1 that shows, in the group of rays of light from the point 901 represented by such two angles, rays of light of the same contrast in the form of contour lines. In FIG. 1, 1, 2, 3 and 4 indicate equal contrast curves, and they are lower in contrast in the named order. The directions of θ=0° and 90° respectively indicate the directions of the axes a1 and a2 of FIG. 2, and the directions of θ=315° and 45° respectively indicate the directions of the axes b1 and b2 of FIG. 2.

As shown in FIG. 1, the contrast distribution on the liquid crystal display surface p1 generally has the tendency that the distribution of the contrast characteristic inclines in directions forming 45° with respect to the directions of polarization on the aforementioned two transparent substrates (the directions of the axes b1 and b2). So, even if the angle θ formed with respect to the liquid crystal display surfaces is the same, a difference in contrast will occur depending on its direction (the angle θ).

Heretofore, in a displaying device as an HMD disposed near an observer's eye, an observation optical system for directing image information displayed by image displaying means to the observer's pupil has used such a light beam of rays of light emerging from the liquid crystal display surface of which a cross-sectional shape perpendicular to the center axis (principal ray) becomes circular. Therefore, when a liquid crystal display element having the contrast characteristic distribution having an inclination as shown in FIG. 1 is used as image displaying means, a light beam entering the observation optical system partially comes to include rays of light of low contrast, and this has led to the problem that irregularity of contrast occurs over the entire display screen or contrast becomes low over the entire display screen.

SUMMARY OF THE INVENTION

The present invention has as its object the provision of a display on which image information can be observed well with high and moreover uniform contrast over an entire screen even if a spatial light modulation element such as a liquid crystal display element in which the contrast distribution greatly differs depending on the angle and direction of emergence of a ray of light from a display surface is used as image displaying means.

One form of the display of the present invention for achieving the above object is characterized by image displaying means for modulating light by a spatial light modulation element and displaying an image, a relay optical system for forming said image on an imaging plane at a location differing from said image displaying means, an eyepiece optical system for directing the light from said imaging plane to an observer's pupil, and light beam controlling means provided in a portion of said relay optical system for controlling the amount of transmission of a light beam from said image displaying means correspondingly to the inclination of the contrast distribution of said light beam.

A preferred form of said relay optical system is characterized in that said image displaying means side is a telecentric system, and a preferred form of said light beam controlling means is characterized in that it is located near the position of the stop of said relay optical system.

A preferred form of said light beam controlling means is characterized by a transmitting area of a shape differing from a circular shape.

A preferred form of said light beam controlling means is characterized by means for varying the shape of said transmitting area.

A preferred form of said light beam controlling means is characterized by means for controlling the transmittance in said transmitting area.

A preferred form of said transmitting area is characterized by satisfying $$0.35 < q/p < 0.75,$$

where p is the maximum diameter of said transmitting area, and q is the minimum diameter of said transmitting area.

A preferred form of said spatial light modulation element has liquid crystal.

The display of the present invention will hereinafter be described with respect to some embodiments thereof.

BRIEF DESCRIPTION OF THE DRAWINGS

FIG. 3 is a schematic view of an optical system in Embodiment 1 of the present invention.

FIGS. 4A, 4B and 4C are illustrations of Embodiments 1 to 3 of stop means according to the present invention.

DESCRIPTION OF THE PREFERRED EMBODIMENTS

Figure 1:
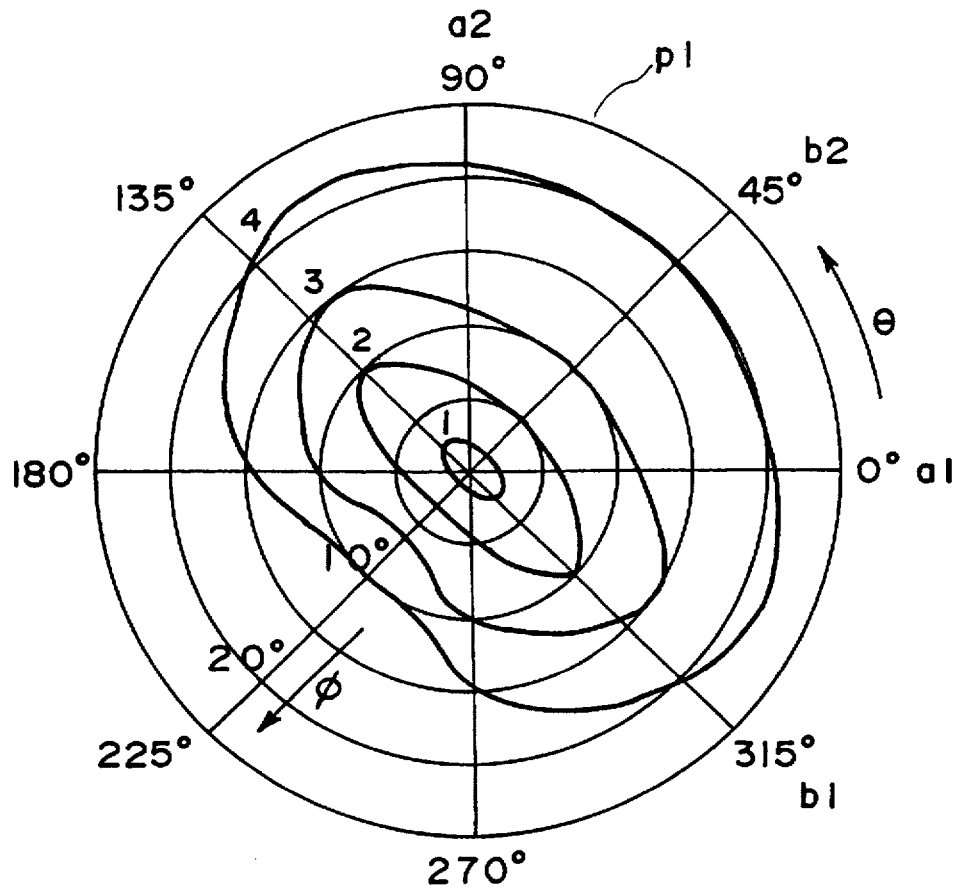
FIG. 1 shows the contrast distribution of a liquid crystal display element.

FIG. 3 is a schematic view of an optical system in Embodiment 1 of the present invention. In FIG. 3, the reference numeral 101 designates a liquid crystal display element (image displaying means, and p1 denotes the liquid crystal display surface of the liquid crystal display element 101 on which image information is displayed. The reference numeral 102 designates a field lens, and the reference numeral 103 denotes a lens unit. The field lens 102 and the lens unit 103 together constitute an element of a relay optical system 108. The reference numeral 104 designates stop means, by which the relay optical system forms a telecentric optical system on the liquid crystal display element side. The stop means 104 has the function as partially light intercepting means for partially controlling the amount of transmission, i.e., the transmittance, of a light beam, corresponding to the inclination of the contrast distribution of the liquid crystal display element 101. The reference numeral 105 denotes an intermediate imaging plane which is the imaging plane for image information by the relay optical system 108. The reference numeral 106 designates an eyepiece optical system which directs the image information formed on the intermediate imaging plane 105 to an observer's pupil. The reference numeral 107 denotes an eye point.

Description will hereinafter be made of the image information observation process by the display of the present embodiment. The image information displayed on the liquid crystal display surface p1 is imaged as an aerial image on the intermediate imaging plane 105 through the relay optical system 108. This aerial image is directed to the observer's eye through the eyepiece optical system 106, and the observer observes the image information displayed on the liquid crystal display surface p1 as a forwardly enlarged virtual image.

As previously described, the stop means 104 makes the relay optical system 108 into a telecentric optical system and therefore, the entrance pupil of the relay optical system 108 is substantially at infinity and accordingly, over the whole of the liquid crystal display surface p1, the center lines (axes A and B in FIG. 3) of the emergent light beam therefrom form substantially the same angle with respect to the liquid crystal display surface p1, and that light beam enters the relay optical system 108. Thus, the contrast characteristic becomes uniform over the whole area of the image information. Also, in the case of the present embodiment, the stop means 104 is located at the position of the stop of the relay optical system 108 and therefore intercepts the light beam on the optical axis and the light beam off the optical axis equally.

When the set position of the stop means 104 which makes the relay optical system 108 into a telecentric optical system is a position not preferable in aberration correction or a physically inappropriate position, design is made such that the refractive power of the field lens 102 which is a first lens of the relay optical system is adjusted and the stop means 104 is at an appropriate position.

FIGS. 4A, 4B and 4C are illustrations showing embodiments of the stop means 104 according to the present invention. In these embodiment, the stop means 104 is given the function as partially light intercepting means. FIG. 4A shows Embodiment 1 of the stop means 104 in which the shape of an opening which is the shape of a transmitting area for transmitting light therethrough is a non-circular shape in which a portion of a circle is deformed, and the ratio (q/p) of the shorter diameter/longer diameter is 0.74.

Herein, the definitions of the longer diameter and shorter diameter are as follows. The longer diameter is defined as a diameter indicative of the maximum diameter of the opening, and the shorter diameter is defined as the width of the opening along a perpendicular to the middle point of the longer diameter. When as in Embodiment 1 the longer diameter is not primarily determined, the diameter for which the shorter diameter assumes a minimum value is defined as the longer diameter.

FIG. 4B shows Embodiment 2 of the stop means 104, in which the shape of the opening is an elliptical shape having its center position on the optical axis, and the ratio q/p of the shorter diameter/longer diameter is 0.66. FIG. 4C shows Embodiment 3 of the stop means 104, in which the shape of the opening is an elliptical shape and moreover has its center position shifted in the direction of 45° (the direction b2) obliquely from the optical axis, and the ratio q/p of the sorter diameter/longer diameter is 0.66. In FIGS. 4A to 4C, dot-and-dash lines indicate axes a1 and a2 along the direction of polarization of the transparent substrate of the liquid crystal display element, and the point of intersection between the two dot-and-dash lines lies on the optical axis of the relay optical system 108. The shapes of the openings in Embodiments 1 to 3 of the stop means 104 are shapes corresponding to the liquid crystal display element having the contrast characteristic of FIG. 1, and are determined in the following manner from the contrast distribution of the liquid crystal display element measured in advance.

Figure 2:
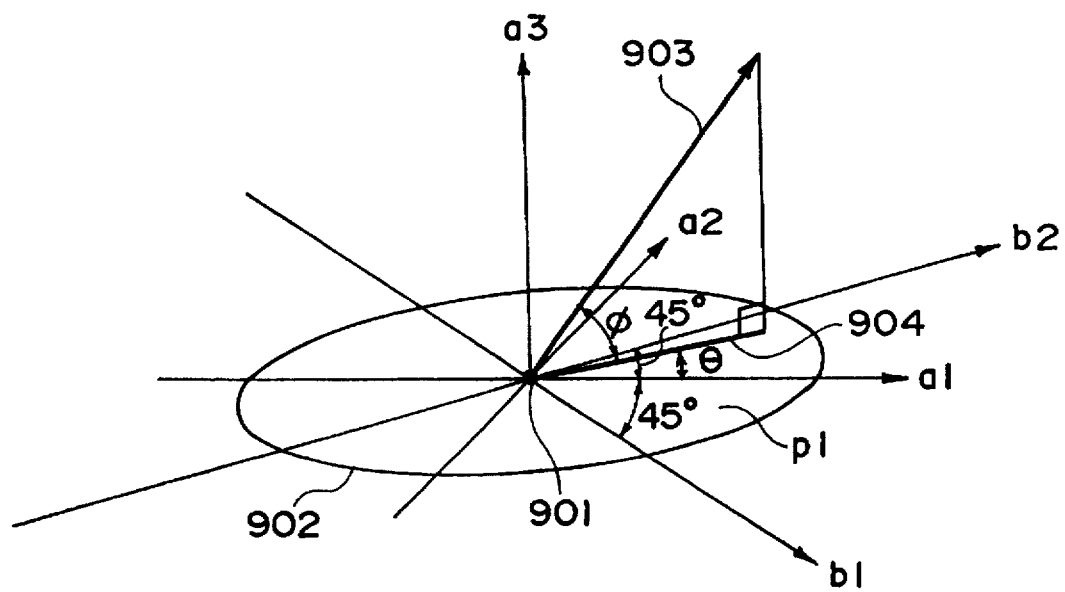
FIG. 2 shows a ray of light emerging from a liquid crystal display surface.

As shown in FIG. 1, the angle of emergence of a ray of light of the highest contrast, of the rays of light emerging from the liquid crystal display surface p1 of the liquid crystal display element is not always in the direction of the normal to the liquid crystal display surface p1 (the central position in FIG. 1 and the direction of the axis a3 in FIG. 2), but a ray of light in a certain direction slightly inclined from the direction of the normal becomes highest. So, the light beam introduced from the liquid crystal display element 101 into the relay optical system 108 is made into a light beam more or less inclined from the direction of the normal to the liquid crystal display surface p1, whereby much of a light beam in an area of high contrast is introduced.

In the liquid crystal display element 101 having such a contrast distribution, lights of contrast below the required contrast are selectively intercepted, whereby image information having a good contrast characteristic is provided to the observer. That is, in the case of the liquid crystal display element 101 having the characteristic of FIG. 1, the ray of light in the left downward area is a ray of light particularly low in contrast, and if the ray of light emerging in this direction is directed to the observer's pupil, a reduction in contrast will result. So, in the display of the present invention, the stop means 104 having a non-circular opening as shown in each of FIGS. 4A to 4C is installed at the stop position which makes the relay optical system 108 into a telecentric optical system, thereby intercepting the above-described light of low contrast. Thereby, the contrast of the virtual image when the observer observes the aerial image on the intermediate imaging plane 105 as an image of high contrast is enhanced. The shape of the opening in the stop means 104 can be whatever can intercept light of low contrast, and is not limited to the shapes shown in FIGS. 4A to 4C, but yet the ratio of the shorter diameter/longer diameter of the opening may suitably be within a range of 0.35 to 0.75. That is, if this ratio is no less than 0.75, the effect of cutting a light beam of low contrast will be insufficient, and if this ratio is no more than 0.35, the introduction of a light beam of high contrast will become insufficient.

Figure 5:
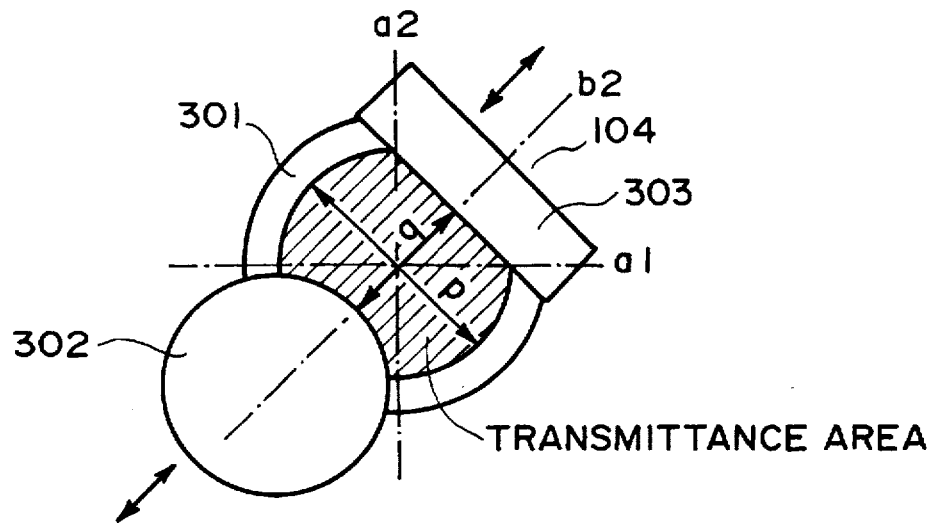
FIG. 5 is an illustration of Embodiment 4 of stop means according to the present invention.

FIG. 5 is an illustration of Embodiment 4 of the stop means 104 according to the present invention. The stop means 104 of this embodiment differs from Embodiments 1 to 3 in that the shape of the opening which is the shape of the transmitting area is variable, and is the same as Embodiments 1 to 3 in the other points. In FIG. 5, the reference numeral 301 designates a light intercepting member having a circular opening therein, the reference numeral 302 denotes a circular light intercepting member, and the reference numeral 303 designates a rectangular light intercepting member. The light intercepting member 301 is disposed at a position for making the relay optical system into a telecentric optical system so that the center of the circular opening therein may lie on the optical axis of the relay optical system. The light intercepting members 302 and 303 are made movable obliquely in the direction of 45° in accordance with the contrast characteristic of the liquid crystal display element. By such a construction, the area and shape of the opening are varied to thereby provide a display capable of adjusting contrast. According to the present embodiment, there is the effect that a display using a plurality of liquid crystal display elements 101 irregular in contrast distribution can be constructed of the same stop means 104. That is, in the case of a display of the multi eye type in which two displays of the present invention are disposed for the observer's right and left eyes, respectively, it becomes possible to change the ratio of the shorter diameter/longer diameter of the opening in the stop means 104 to thereby uniformize the contrast characteristic of the displayed image on each display, and there is achieved a display of the multi eye type in which the fused images of right and left images are easy to see and which little fatigues the observer.

The shapes of the light intercepting members may be any shapes which can cut light of low contrast, and are not limited to a circle and a rectangle, but yet for the reason set forth previously, the ratio of the shorter diameter/longer diameter of the opening is desirably within the range of 0.35 to 0.75.

Figure 6A:
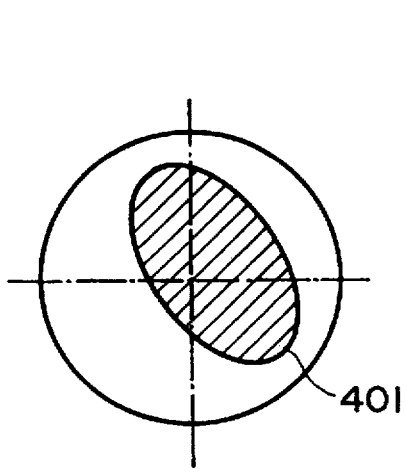
FIGS. 6A and 6B are illustrations of Embodiment 5 of stop means according to the present invention.
Figure 6B:
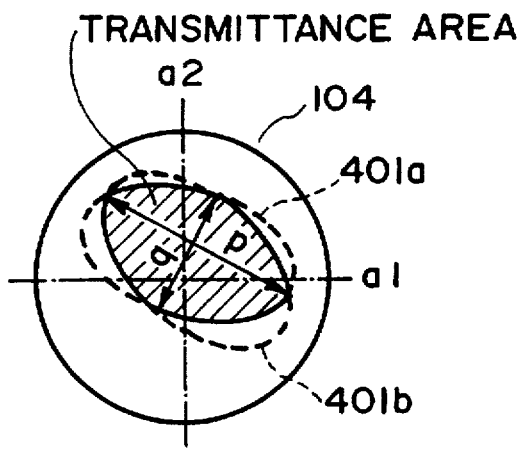

FIGS. 6A and 6B are illustrations of Embodiment 5 of the stop means 104 according to the present invention. The stop means 104 of this embodiment differs from Embodiments 1 to 3 in that it is constructed by the use of a plurality of light intercepting members each having an opening of a predetermined shape therein, and in the other points, this embodiment is the same as Embodiment 1 to 3. That is, in the present embodiment, two light intercepting members 401 each having an elliptical opening as shown in FIG. 4A are superposed one upon the other as shown in FIG. 6B to thereby constitute the stop means 104. In FIG. 6B, elliptical openings 401a and 401b indicated by dotted lines represent two light intercepting members, and an opening therein indicated by solid line represents the transmitting area for a light beam passing through the two light intercepting members 401a and 401b. With such a construction, a combination of light intercepting members each having an elliptical or otherwise shaped opening constitutes the stop means 104 in which a non-circular opening member can be rotate to thereby adjust the transmitting area.

Figure 7:
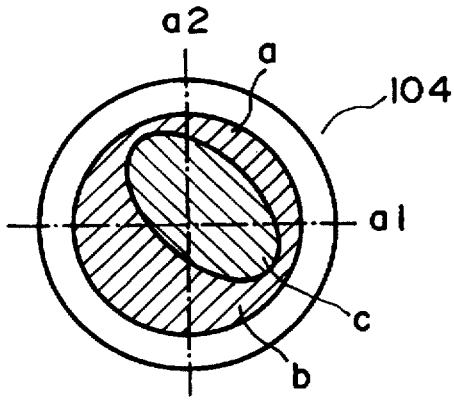
FIG. 7 is an illustration of Embodiment 6 of the stop means 104 according to the present invention.

FIG. 7 is an illustration of Embodiment 6 of the stop means 104 according to the present invention. The stop means 104 of this embodiment differs from Embodiments 1 to 3 in that it is constructed of a transmittance control type in which the transmittance of the interior of the opening which is a transmitting area is varied depending on portions of the transmitting area, and in the other points, this embodiment is the same as Embodiments 1 to 3. In FIG. 7, the letter a designates a circular opening, and the other portion is a light intercepting portion which does not pass light therethrough, and an area c is a non-circular area of which the light transmittance is 100%, and an area b is an ND filter of which the light transmittance is set to a certain value between 0% and 100%. By the transmittance in the opening being thus made non-uniform, light of high contrast is transmitted by 100% and light of low contrast is attenuated by the ND filter and is transmitted at a suitable transmittance. Thus, in the stop means 104 of the present embodiment, the transmittance is stepwisely set for light of low contrast to light of high contrast and high contrast is obtained as a whole, and yet the efficiency of light utilization is enhanced. If the interior of the opening is constituted by a number of ND filters differing in transmittance or a filter of the density distribution type and the transmittance is controlled more continuously, the aforementioned effect will be further enhanced.

In the present invention, partially light intercepting means may be constructed independently of the stop means 104, and the partially light intercepting means may be provided near the stop means.

Next, the relay optical system 108 and eyepiece optical system 106 according to the present invention need not be the refracting systems shown in Embodiment 1, but the same effect will also be obtained if they are reflecting systems.

Figure 8:
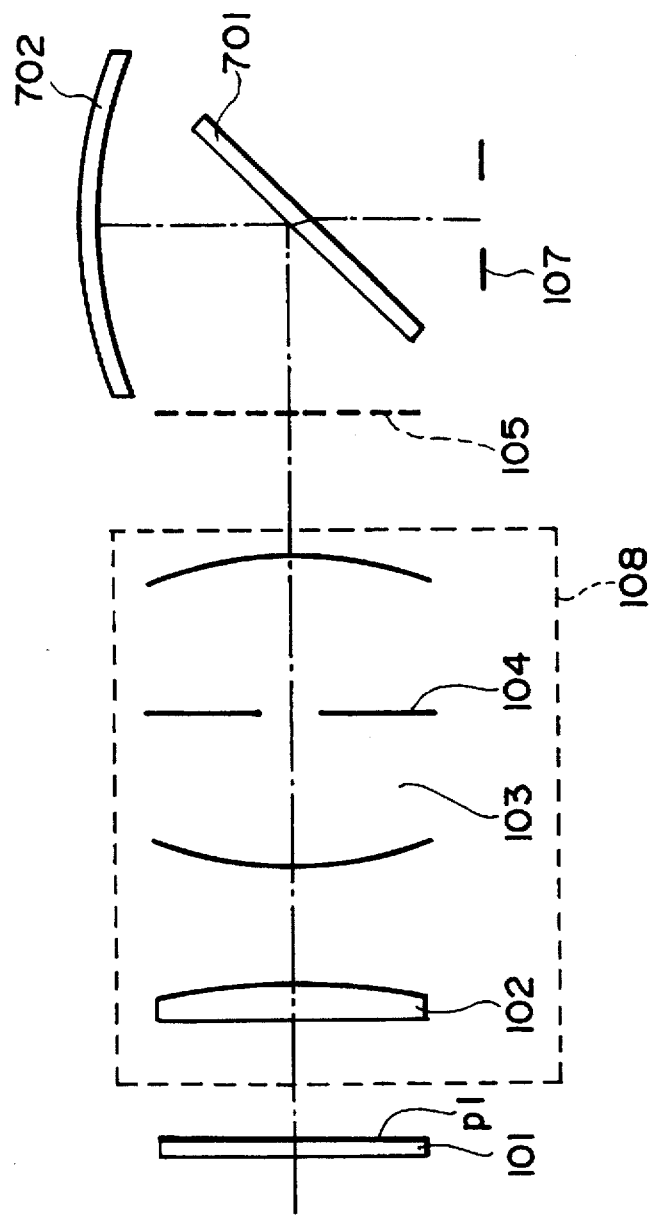
FIG. 8 is a schematic view of an optical system in Embodiment 2 of the present invention.

FIG. 8 is a schematic view of an optical system in Embodiment 2 of the present invention. In Embodiment 2, the eyepiece optical system is constructed of a reflecting system, and the same elements as those shown in FIG. 1 are given the same reference numerals. In FIG. 8, the reference numeral 701 designates a plane half mirror and the reference numeral 722 denotes a curved surface mirror. The system from the liquid crystal display element 101 to the intermediate imaging plane 105 is the same as that in FIG. 3. The image information displayed by the liquid crystal display surface p1 causes an aerial image to be formed on the intermediate imaging plane 105 by the relay optical system 108. A light beam from this aerial image is reflected toward the curved surface mirror 702 by the half mirror 701, and the reflected light beam reflected by the curved surface mirror 702 is transmitted through the half mirror 701 to arrive at the eye point 107. Here, it is the curved surface mirror 702 that acts as an eyepiece optical system. Again in the present embodiment, the stop means 104 has the function of partially light intercepting means, and each embodiment described in connection with Embodiment 1 can be used as the stop means 104, and the effect in that case is the same as that of Embodiment 1.

Figure 9:
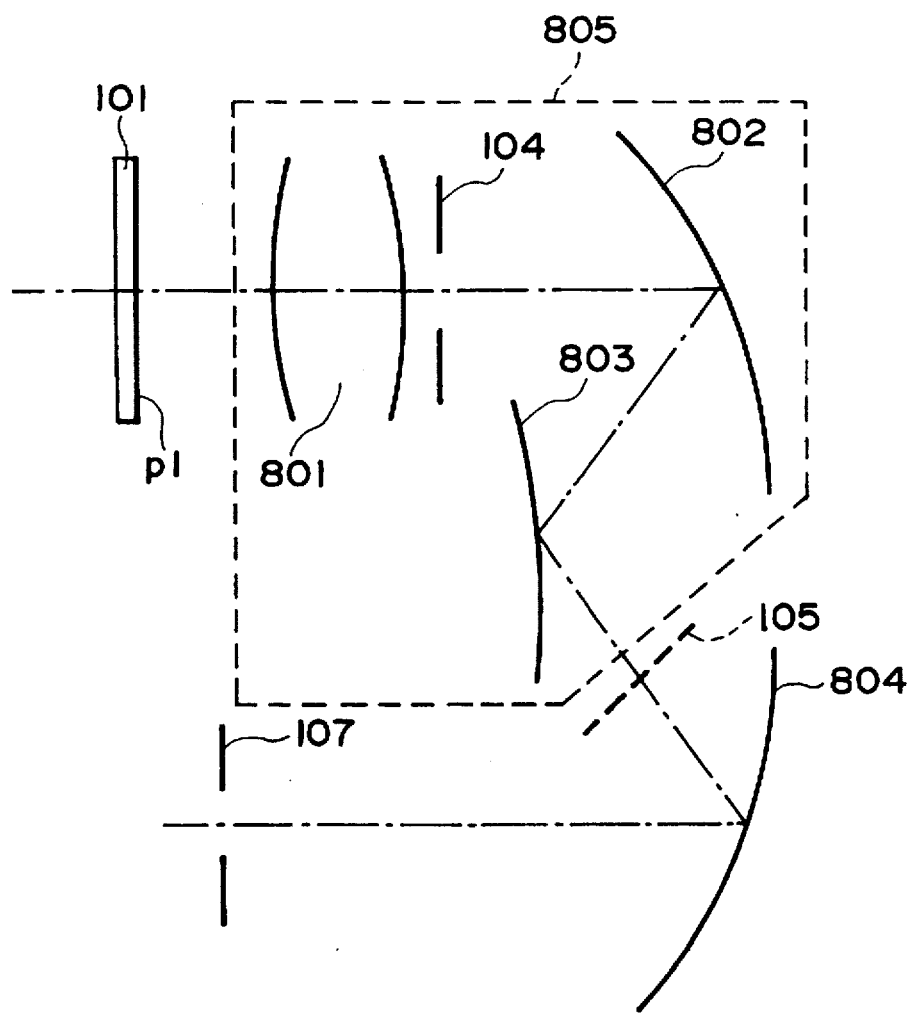
FIG. 9 is a schematic view of an optical system in Embodiment 3 of the present invention.

FIG. 9 is a schematic view of an optical system in Embodiment 3 of the present invention. In Embodiment 3, both of the relay optical system and the eyepiece optical system are constructed of a system including a reflecting optical system. In FIG. 9, the reference numeral 801 designates a lens unit in a refracting system, and the reference numerals 802 and 803 denote curved surface mirrors. The lens unit 801 and the curved surface mirrors 802 and 803 together constitute an element of a relay optical system 805. The reference numeral 804 designates a curved surface mirror which constitutes the eyepiece optical system. The image information displayed by the liquid crystal display surface p1 is imaged as an aerial image on the intermediate imaging plane 105 by the lens unit 801 and the curved surface mirrors 802, 803. A light beam from this aerial image is directed to the eye point 107 by the curves surface mirror 804, and the observer observes the image information displayed on the liquid crystal display surface p1 as an enlarged virtual image. The stop means 104 is installed at a position which makes the relay optical system 805 into a telecentric optical system. Again in the present embodiment, the stop means 104 has the function of partially light intercepting means, and each embodiment described in connection with Embodiment 1 can be used as the stop means 104, and the effect in that case is the same as that of Embodiment 1.

The curved surface mirror 702 in Embodiment 2 of FIG. 8 and the curved surface mirror 804 in Embodiment 3 of FIG. 9 may each be constructed of a beam splitter such as a half mirror having the reflecting and transmitting functions, and according to this, it is possible to observe the image information on the display while being superposed on an exterior scene.

The invention may be embodied in other specific forms without departing from the spirit or essential characteristics thereof. The aforedescribed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A display apparatus comprising:
  image displaying means for modulating light by a spatial light modulation element to display an image,
  wherein said image displaying means has two substrates whose polarization directions are mutually orthogonal and a liquid crystal enclosed between said two substrates,
  wherein contrast of an image to be imaged corresponds to angles of emergence of a ray of light from said image displaying means;
  a relay optical system for forming said image on an imaging plane at a location differing from said image displaying means;
  an eyepiece optical system for directing the light of said imaging plane to an observer's pupil;
  light beam controlling means disposed near a portion of a stop of said relay optical system for intercepting light whose contrast is under a predetermined level of light from said image displaying means; and
  wherein said light beam controlling means intercepts light emerging from said image displaying means in a first direction which is directed by 45 degrees with relative to the polarization directions of said two substrates more widely than the said light beam controlling means intercepts light emerging in a second direction orthogonal to said first direction.

2. An apparatus according to claim 1 wherein said light beam controlling means has a transparent area of a shape different from a circular shape said transparent area has the minimum diameter in said first direction and the maximum diameter in said second direction.

3. An apparatus according to claim 2, wherein said light beam controlling means has means for varying the shape of said transmitting area.

4. An apparatus according to claim 2, wherein said light beam controlling means has means for controlling said transmittance in said transmitting area.

5. An apparatus according to claim 2 satisfying:

$$0.35 < q/p < 0.75,$$

wherein p is the maximum diameter of said transmitting area and q is the minimum diameter of said transmitting area.

* * * * *

UNITED STATES PATENT AND TRADEMARK OFFICE
CERTIFICATE OF CORRECTION

PATENT NO. : 5,764,407
DATED : June 9, 1998
INVENTOR(S) : Norihiro Nanba

It is certified that error appears in the above-identified patent and that said Letters Patent is hereby corrected as shown below:

Col. 2, line 48, change "$\theta$" to --$\Phi$--.

Signed and Sealed this

Twenty-ninth Day of September, 1998

Attest:

BRUCE LEHMAN

*Attesting Officer*  *Commissioner of Patents and Trademarks*